(12) United States Patent
Tezuka et al.

(10) Patent No.: US 9,384,569 B2
(45) Date of Patent: Jul. 5, 2016

(54) WAVEFORM DISPLAY DEVICE WITH DATA MANAGEMENT FUNCTION

(71) Applicant: FANUC CORPORATION, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 262 days.

(21) Appl. No.: 13/690,259

(22) Filed: Nov. 30, 2012

(65) Prior Publication Data

US 2013/0222391 A1     Aug. 29, 2013

(30) Foreign Application Priority Data

Feb. 27, 2012    (JP) .................................. 2012-39568

(51) Int. Cl.
*G06T 11/20* (2006.01)
(52) U.S. Cl.
CPC ............... *G06T 11/20* (2013.01); *G06T 11/206* (2013.01)
(58) Field of Classification Search
CPC ....................................................... G06T 11/20
See application file for complete search history.

(56) References Cited

U.S. PATENT DOCUMENTS

| | | | | |
|---|---|---|---|---|
| 5,144,212 A | * | 9/1992 | Izawa et al. .................. | 318/569 |
| 2005/0141314 A1 | * | 6/2005 | Ito et al. ......................... | 365/222 |
| 2010/0265253 A1 | * | 10/2010 | Li ................................... | 345/440 |
| 2011/0015877 A1 | * | 1/2011 | Okita et al. ..................... | 702/41 |
| 2012/0007536 A1 | | 1/2012 | Iwashita et al. | |

FOREIGN PATENT DOCUMENTS

| | | |
|---|---|---|
| JP | 3264215 A | 11/1991 |
| JP | 2002-312007 A | 10/2002 |
| JP | 2004-199530 A | 7/2004 |
| JP | 20089637 A | 1/2008 |

OTHER PUBLICATIONS

Decision to Grant a Patent mailed Oct. 22, 2013, corresponds to Japanese patent application No. 2012-039568.
Office Action mailed Aug. 27, 2014, corresponding to Chinese patent application No. 201310061901.7.
Office Action with English translation dated Apr. 9, 2013 (5 pages).
Office Action dated Feb. 9, 2015, corresponding to German patent application No. 102013101838.6.

* cited by examiner

*Primary Examiner* — William Beutel
(74) *Attorney, Agent, or Firm* — Hauptman Ham, LLP

(57) ABSTRACT

A waveform display device with a data management function acquires drive-axis data of a machine tool from a numerical controller for controlling the machine tool and acquires parameters of the numerical controller from the numerical controller. The waveform display device manages the drive-axis data and the parameters in association with each other, based on a time at which the drive-axis data is acquired and a time at which the parameter is acquired. These times of acquisition of the drive-axis data and the parameters are set by a timer of the waveform display device.

9 Claims, 7 Drawing Sheets

| TIME OF ACQUISITION | DRIVE-AXIS DATA | PARAMETER-CHANGE HISTORY |
|---|---|---|
| 2011/12/27 18:00 | POSITION ACQUISITION | No. 2000 28 ⇒ 30 |
| 2011/12/27 18:01 | . | No. 2001#0 0 ⇒ 1 |
| 2011/12/27 18:02 | SPEED ACQUISITION | No. 2002#5 1 ⇒ 0 |
| . | . | . |
| . | . | . |
| 2011/12/28 00:01 | CURRENT ACQUISITION | No. 1800#3 0 ⇒ 1 |
| 2011/12/28 00:02 | . | No. 2500 100 ⇒ 200 |
| 2011/12/28 00:03 | . | No. 3400 300 ⇒ 50 |

FIG. 6

| TIME OF ACQUISITION | DRIVE-AXIS DATA | PARAMETER |
|---|---|---|
| 2011/12/27 18:00 | POSITION ACQUISITION | PARAMETER ACQUISITION |
| 2011/12/27 18:01 | . | . |
| 2011/12/27 18:02 | SPEED ACQUISITION | PARAMETER ACQUISITION |
| . | . | . |
| . | . | . |
| 2011/12/28 00:01 | CURRENT ACQUISITION | PARAMETER ACQUISITION |
| 2011/12/28 00:02 | . | . |
| 2011/12/28 00:03 | . | . |

FIG. 7

| TIME OF ACQUISITION | DRIVE-AXIS DATA | PARAMETER-CHANGE HISTORY |
|---|---|---|
| 2011/12/27 18:00 | POSITION ACQUISITION | No. 2000 28 ⇒ 30 |
| 2011/12/27 18:01 | . | No. 2001#0 0 ⇒ 1 |
| 2011/12/27 18:02 | SPEED ACQUISITION | No. 2002#5 1 ⇒ 0 |
| . | . | . |
| . | . | . |
| 2011/12/28 00:01 | CURRENT ACQUISITION | No. 1800#3 0 ⇒ 1 |
| 2011/12/28 00:02 | . | No. 2500 100 ⇒ 200 |
| 2011/12/28 00:03 | . | No. 3400 300 ⇒ 50 |

WAVEFORM DISPLAY DEVICE WITH DATA MANAGEMENT FUNCTION

RELATED APPLICATIONS

The present application claims priority from Japanese Application Number 2012-39568 filed Feb. 27, 2012, the disclosure of which is hereby incorporated by reference herein in its entirety.

BACKGROUND OF THE INVENTION

1. Field of the Invention

The present invention relates to a waveform display device with a data management function.

2. Description of the Related Art

In a numerical controller for drivingly controlling a plurality of drive axes of machine tools or industrial machines, parameters are set to assign operating conditions, such as their control systems, acceleration/deceleration, etc. These set parameters are evaluated by using a waveform display device that acquires data, such as the positions and speeds of the drive axes, from the numerical controller and displays them. Further, malfunctioning of the machine due to erroneous parameter setting is prevented by means of a numerical controller having the function of storing and presenting parameter rewrite data to an operator so that the operator can identify changed parameters afterward.

For example, Japanese Patent Application Laid-Open No. 2004-199530 discloses a numerical controller for controlling a machine tool, having a parameter rewrite history function capable of reserving parameter rewrite history information by storing the parameter rewrite history information in a program storage unit, without using special storage means or dedicated reading means.

Further, Japanese Patent Application Laid-Open No. 2002-312007 discloses another numerical controller for controlling a machine tool, based on a save reminding technique for an operator such that a history of parameter rewrite is detected and rewrite history information is presented to the operator. According to this technique, the operator can securely notice the performance of parameter rewrite and is urged to save parameters based on the rewrite history information.

The techniques disclosed in Japanese Patent Applications Laid-Open Nos. 2004-199530 and 2002-312007 described above are not intended to manage parameters and drive-axis data in association with each other by means of a waveform display device. Thus, measured data are conventionally managed on the side of the waveform display device, and the parameters on the side of the numerical controller. Therefore, it is difficult to accurately grasp parameter setting information during the measurement of the drive-axis data, so that the parameters cannot be effectively adjusted. In the case where the measured data and the parameters are managed in association with each other, moreover, it is necessary to save the parameters for each measured data and manage the individual data correspondingly. Accordingly, substantial labor is required of the operator. Since these operations are not automatically performed, furthermore, the parameters cannot be correctly evaluated if they are erroneously associated with one another.

SUMMARY OF THE INVENTION

Accordingly, the object of the present invention is to provide a waveform display device with a data management function, capable of easily extracting parameters corresponding to desired drive-axis data by managing the drive-axis data and the parameters on the side of the waveform display device, thereby easily comparing the parameters between the drive-axis data and effectively adjusting the parameters.

A waveform display device with a data management function according to the present invention is connected to a numerical controller for drivingly controlling a machine tool, acquires drive-axis data representative of an operation and/or state of the machine tool obtained from the numerical controller, and displays a waveform of the drive-axis data. The waveform display device comprises: a drive-axis data acquisition unit configured to acquire the drive-axis data from the numerical controller; a parameter acquisition unit configured to acquire a parameter of the numerical controller from the numerical controller; and an acquired data management unit configured to manage the drive-axis data and the parameter in association with each other, based on a time at which the drive-axis data is acquired and a time at which the parameter is acquired. The time at which the drive-axis data is acquired and the time at which the parameter is acquired are generated by a timer of the waveform display device.

The parameter acquisition unit may be configured to further acquire a parameter-change history including a time at which the parameter is changed from the numerical controller, and the acquired data management unit may be configured to manage the drive-axis data and a parameter in the parameter-change history in association with each other, based on the time at which the drive-axis data is acquired and the time at which the parameter is changed in the parameter-change history. The waveform display device may further comprise a time adjustment unit configured to adjust the time at which the drive-axis data is acquired and the time at which the parameter is changed, based on a time lag between timers attached to the numerical controller and the waveform display device.

The waveform display device may further comprise a management data selection unit capable of arbitrarily selecting the drive-axis data and the parameter that are managed in association with each other by the acquired data management unit. The waveform display device may further comprise a management data output unit configured to output the drive-axis data and the parameter selected by the management data selection unit to at least one of output devices including a display unit and a memory unit.

According to the present invention, there can be provided a waveform display device with a data management function, capable of easily extracting parameters corresponding to desired drive-axis data by managing the drive-axis data and the parameters on the side of the waveform display device, thereby easily comparing the parameters between the drive-axis data and effectively adjusting the parameters.

BRIEF DESCRIPTION OF THE DRAWINGS

The above and other objects and features of the present invention will be obvious from the ensuing description of embodiments with reference to the accompanying drawings, in which:

FIG. 6 is a diagram illustrating how the drive-axis data and parameters are managed in association with each other based on times of acquisition of these data;

FIG. 7 is a diagram illustrating how the drive-axis data and a parameter-change history are managed in association with each other based on times of their acquisition.

DETAILED DESCRIPTION OF THE PREFERRED EMBODIMENTS

Figure 1:
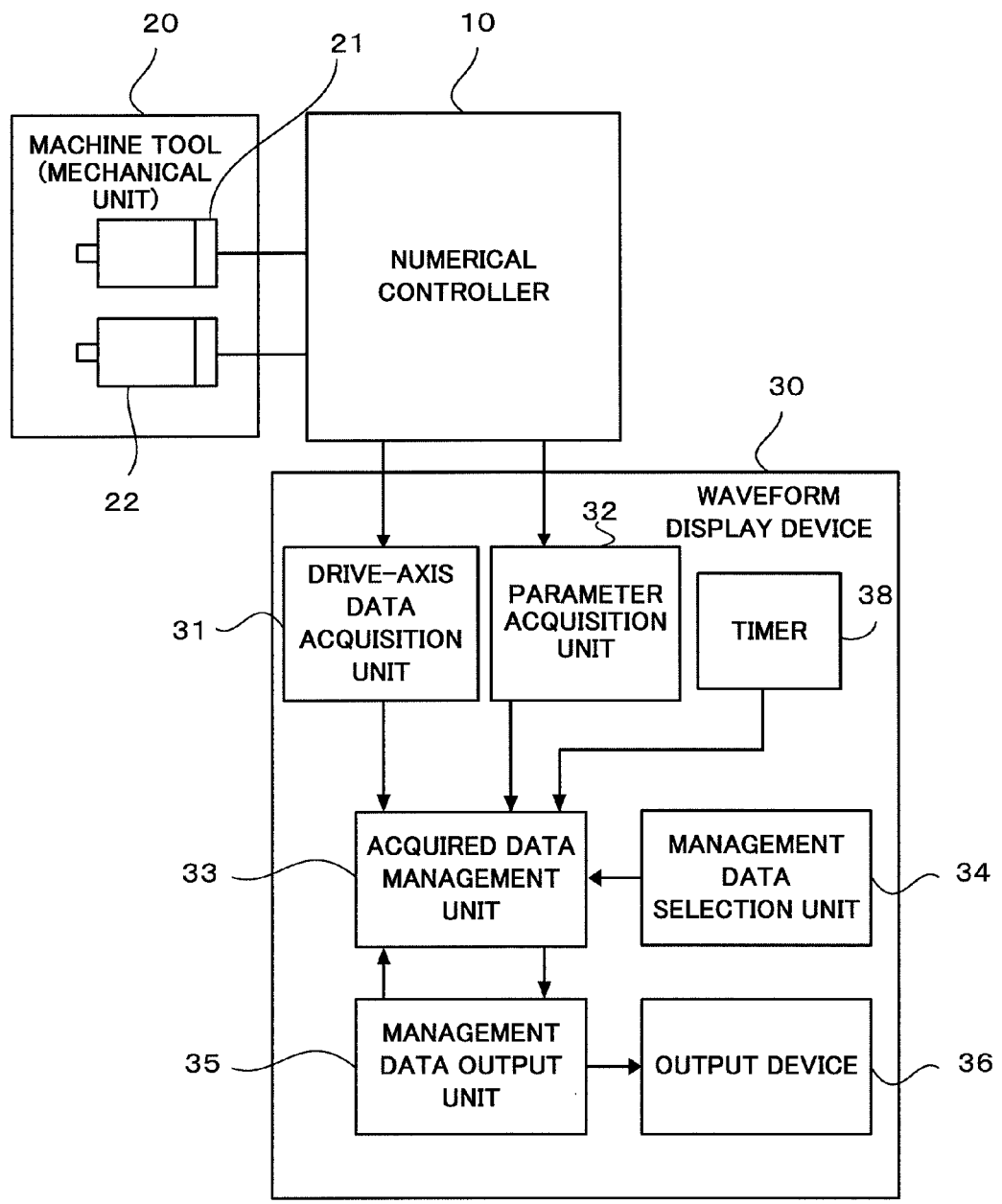
FIG. 1 is a diagram illustrating a first embodiment of a waveform display device with a data management function according to the present invention, using time data of a timer of the waveform display device.

A first embodiment of a waveform display device with a data management function according to the present invention will now be described with reference to FIG. 1.

A machine tool 20 comprises two drive axes 21 and 22 each including a servomotor in their mechanical section. The number of drive axes of the machine tool 20 is not limited to two but may be one or three or more, if necessary. A numerical controller 10 for drivingly controlling the machine tool 20 controls various drive axes, such as the drive axes 21 and 22 of the machine tool 20, according to a machining program, thereby controlling the relative positions and attitudes of a tool and a workpiece to machine the workpiece.

Further, the numerical controller 10 has the functions of acquiring position data fed back from position sensors (not shown) attached to the individual drive axes and generating speed and acceleration data based on the position data. The position, speed, and acceleration data are drive-axis data, which represent the operations of the drive axes. Furthermore, command data for position, speed, acceleration, etc., generated by the numerical controller 10 and given to the drive axes 21 and 22 of the machine tool 20, are also handled as drive-axis data representative of the operations of the drive axes. Further, data representative of the states of the drive axes include data on temperature, current, voltage, etc., fed back from the drive axes 21 and 22, current and voltage commands given from the numerical controller 10 to the drive axes 21 and 22, and command data from a programmable machine controller (PMC) given to the machine tool 20.

Further, the numerical controller 10 has the function of setting and changing various parameters for controlling the machine tool 20. The configuration of the numerical controller 10 described above is a conventional one.

A waveform display device 30 is, for example, a personal computer provided with calculation means, display means, communication means, and storage means. The waveform display device 30 comprises a drive-axis data acquisition unit 31, parameter acquisition unit 32, and timer 38. The drive-axis data acquisition unit 31 acquires drive-axis data obtained from or calculated by the machine tool 20. The parameter acquisition unit 32 acquires data on various parameters set in the numerical controller 10. The timer 38 generates time data.

The waveform display device 30 further comprises an acquired data management unit 33, management data selection unit 34, management data output unit 35, and output device 36. The acquired data management unit 33 manages various data obtained from the numerical controller 10 in real time by the drive-axis data acquisition unit 31 and the parameter acquisition unit 32 in association with the time data generated by the timer 38, as shown in FIG. 6. FIG. 6 shows how the drive-axis data and parameters are managed in association with each other based on the times of acquisition of these data.

The drive-axis data and parameters managed by the acquired data management unit 33 can be arbitrarily selected by the management data selection unit 34. The data selected by the management data selection unit 34 are output to the output device 36, including a display unit, memory unit, etc., through the management data output unit 35.

It is known that the numerical controller 10 comprises parameter-change-history storage means for storing the history of parameters changed by an operator's operation. Data acquired by the waveform display device 30 include drive-axis data acquired in real time and data acquired by and stored in the numerical controller 10. In case where drive-axis data and parameters are acquired by the different units, as mentioned before, it is difficult to associate the drive-axis data with the parameters on the time-series basis if there is a discrepancy in timer functions of those units. Thus, in displaying the drive-axis data and parameters by the waveform display device 30, the time at which the data is acquired is set by means of the timer 38 of the waveform display device 30.

In acquiring past parameters and parameter-change history stored in the numerical controller 10, however, the time at which the data is acquired or changed is set by means of a timer 11 attached to the numerical controller 10 (not the timer 38 of the waveform display device 30). Inevitably, the aforementioned time cannot exactly correspond to the time of the drive-axis data that is acquired on the side of the waveform display device 30.

Figure 2:
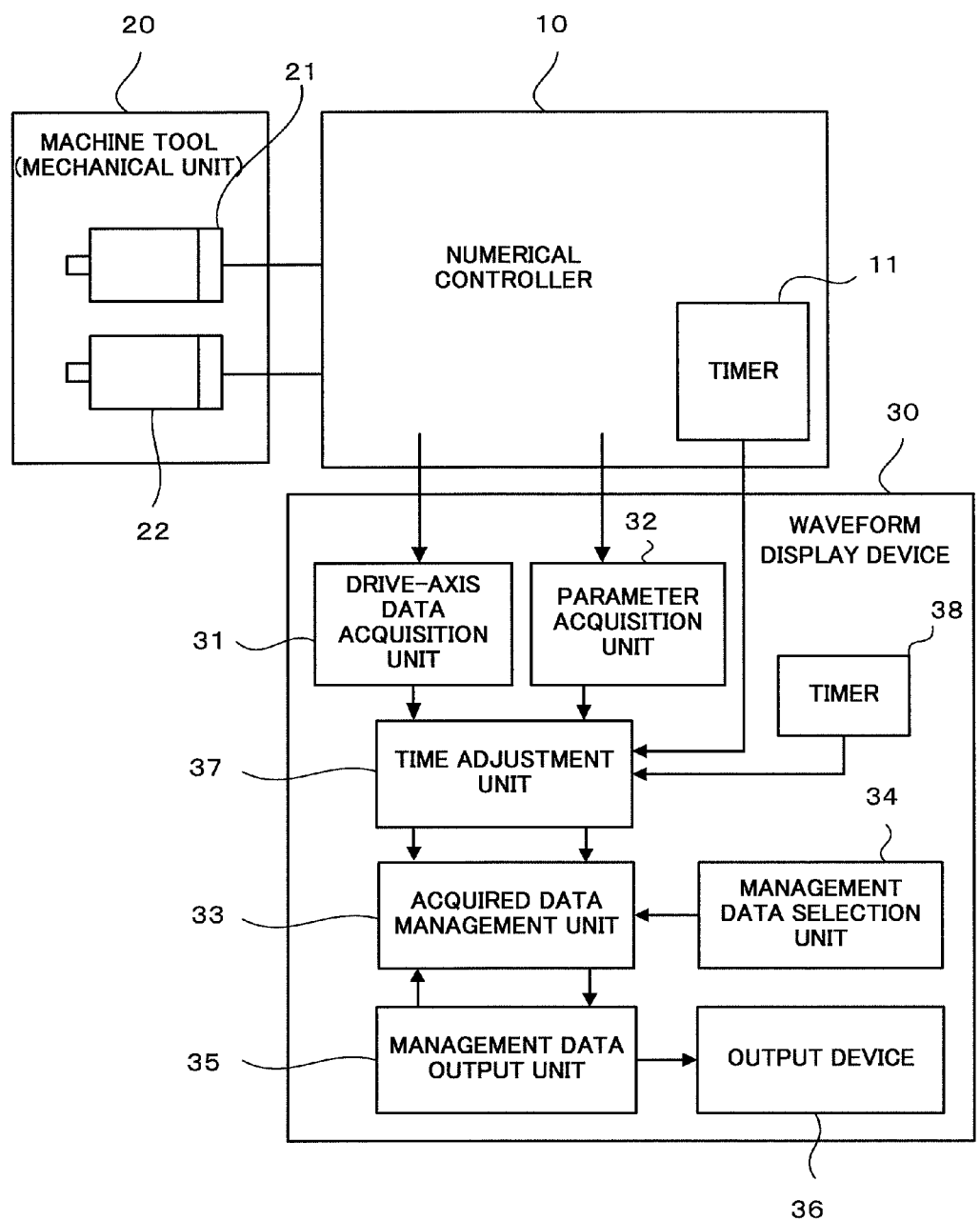
FIG. 2 is a diagram illustrating a second embodiment of the waveform display device with a data management function according to the present invention, using time data of a numerical controller and the waveform display device.

To solve such a problem, a time adjustment unit 37 is provided, as shown in FIG. 2, on the waveform display device 30 so that a time at which drive-axis data is acquired and at time at which parameter or parameter-change history is acquired are adjusted by the time adjustment unit 37. The time adjustment unit 37 acquires time data from the timer 11 of the numerical controller 10 and time data from the timer 38 of the waveform display device 30 simultaneously, and adds the difference between the time data from the timer 11 and the time data from the timer 38 to the time at which the drive-axis data is acquired or the time at which the parameters are acquired or changed. In this way, times can be set in accordance with the setting of either of the timer 38 of the waveform display device 30 or the timer 11 of the numerical controller 10.

FIG. 7 shows how the acquired data management unit 33 manages the drive-axis data obtained in real time by the waveform display device 30 and the parameter-change history acquired or changed by the numerical controller 10 in association with each other. In the example shown in FIG. 7, the drive-axis data and the parameter-change history are managed in association with each other based on the time at which the drive-axis data or the parameter-change history is acquired.

Figure 3:
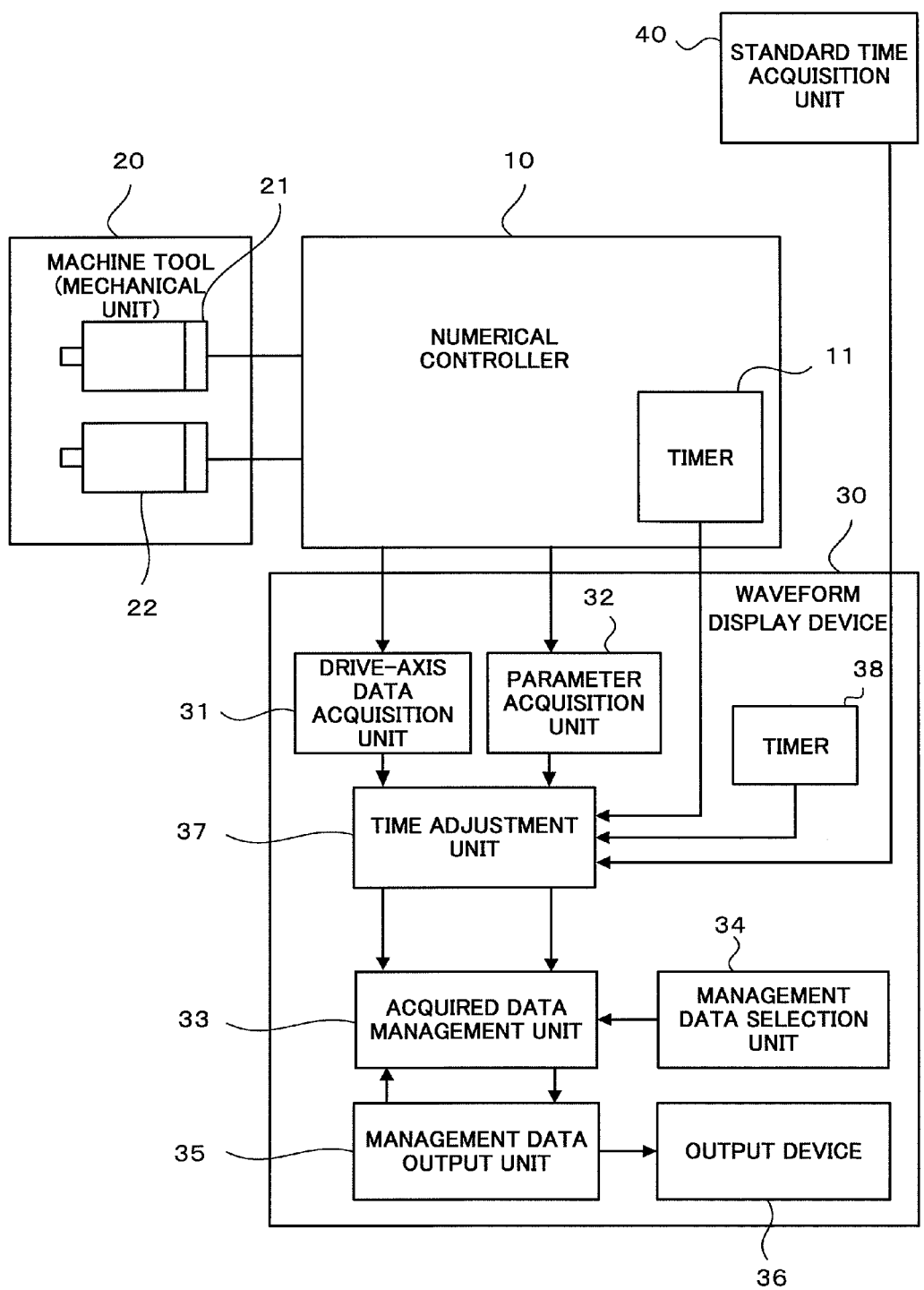
FIG. 3 is a diagram illustrating a third embodiment of the waveform display device with a data management function according to the present invention, using standard time data.

As shown in FIG. 3, moreover, accurate time adjustment can be achieved by adjusting a time at which drive-axis data is acquired and a time at which parameter is acquired or changed, based on a standard time acquired by a standard time acquisition unit 40, such as a radio clock or a GPS clock capable of accurately acquiring time data, provided besides the respective timers 11 and 38 of the numerical controller 10 and the waveform display device 30.

Figure 8:
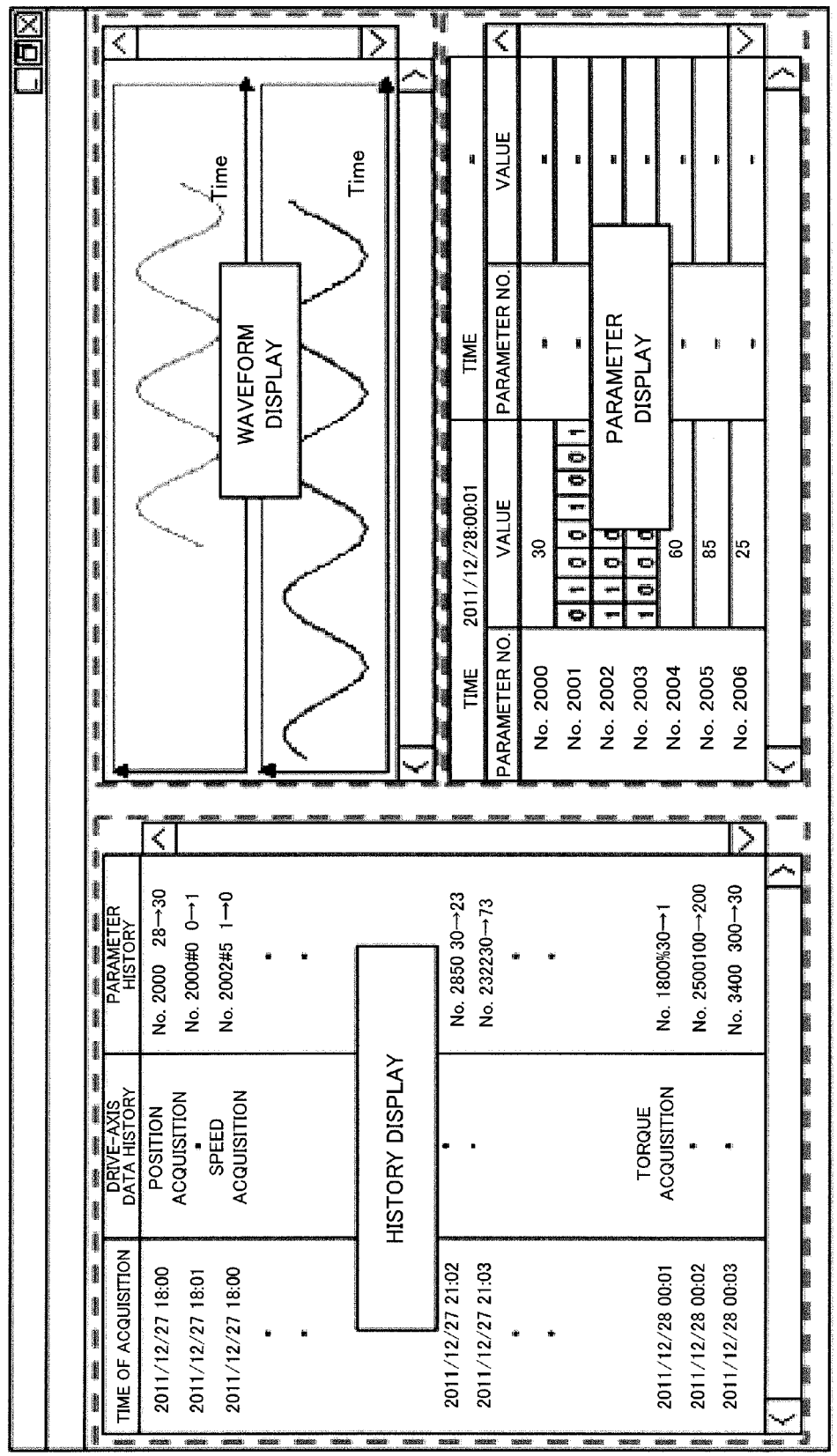
FIG. 8 is a diagram illustrating history display, waveform display, and parameter display on a display screen.

A display example displayed on the display unit as an example of the output device 36 of the waveform display device 30 shown in FIGS. 1 to 3 will be described with reference to FIG. 8. This display unit presents the history of drive-axis data and the history of parameters in association with each other to the operator, based on the times at which these data is acquired. If the operator selects any desired data from among the presented data, the selected drive-axis data and parameters are displayed on a screen.

Figure 4:
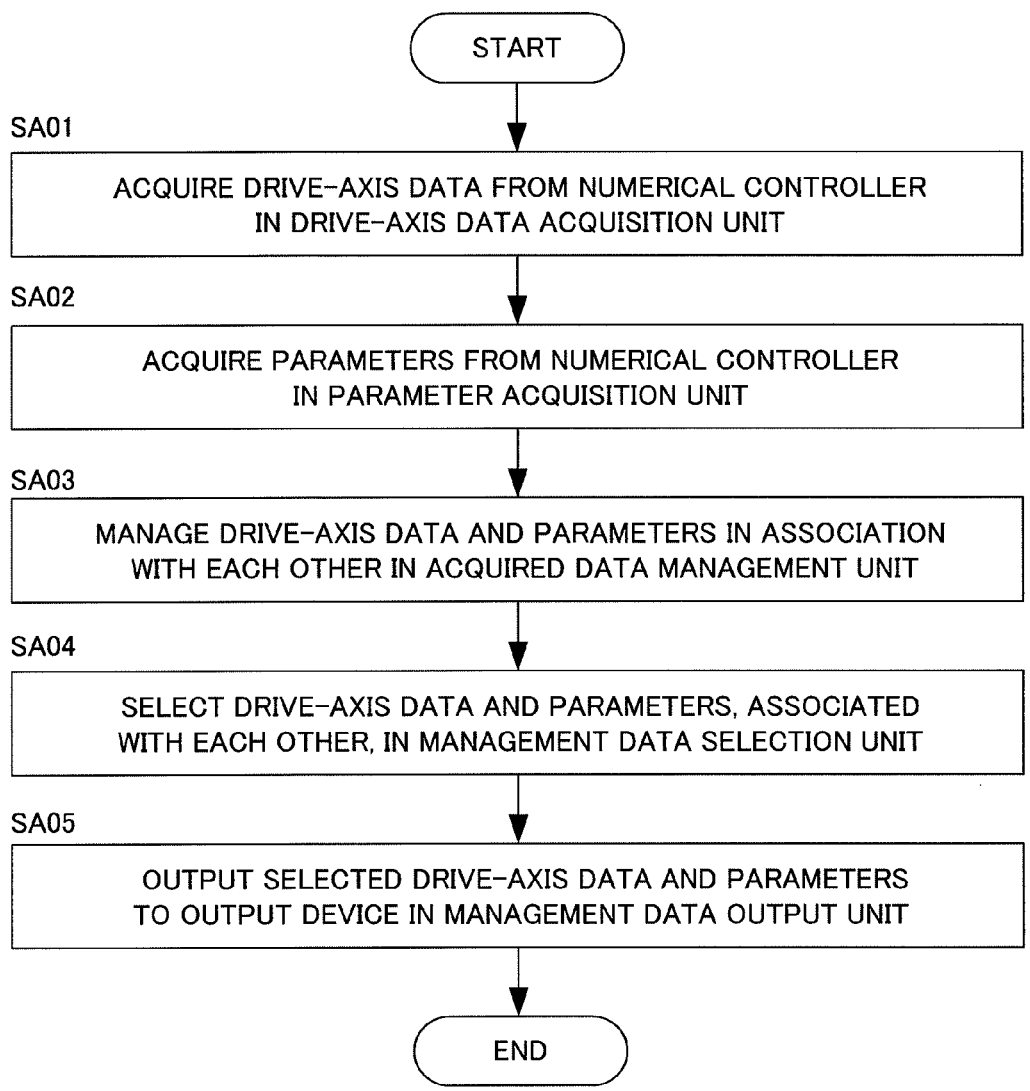
FIG. 4 is a flowchart illustrating management and output processing for drive-axis data and parameters performed by the waveform display device of FIG. 1.

Management and output processing for the drive-axis data and parameters performed by the waveform display device of FIG. 1 will be described with reference to the flowchart of FIG. 4. The following is a description of steps of this processing.

[Step SA01] In the drive-axis data acquisition unit 31, the drive-axis data are acquired from the numerical controller 10.

[Step SA02] In the parameter acquisition unit 32, the parameters are acquired from the numerical controller 10.

[Step SA03] In the acquired data management unit 33, the drive-axis data and parameters are managed in association with each other.

[Step SA04] In the management data selection unit 34, the drive-axis data and parameters, associated with each other, are selected.

[Step SA05] In the management data output unit 35, the drive-axis data and parameters selected by the management data selection unit 34 are output to the output device 36, whereupon this processing ends.

Figure 5:
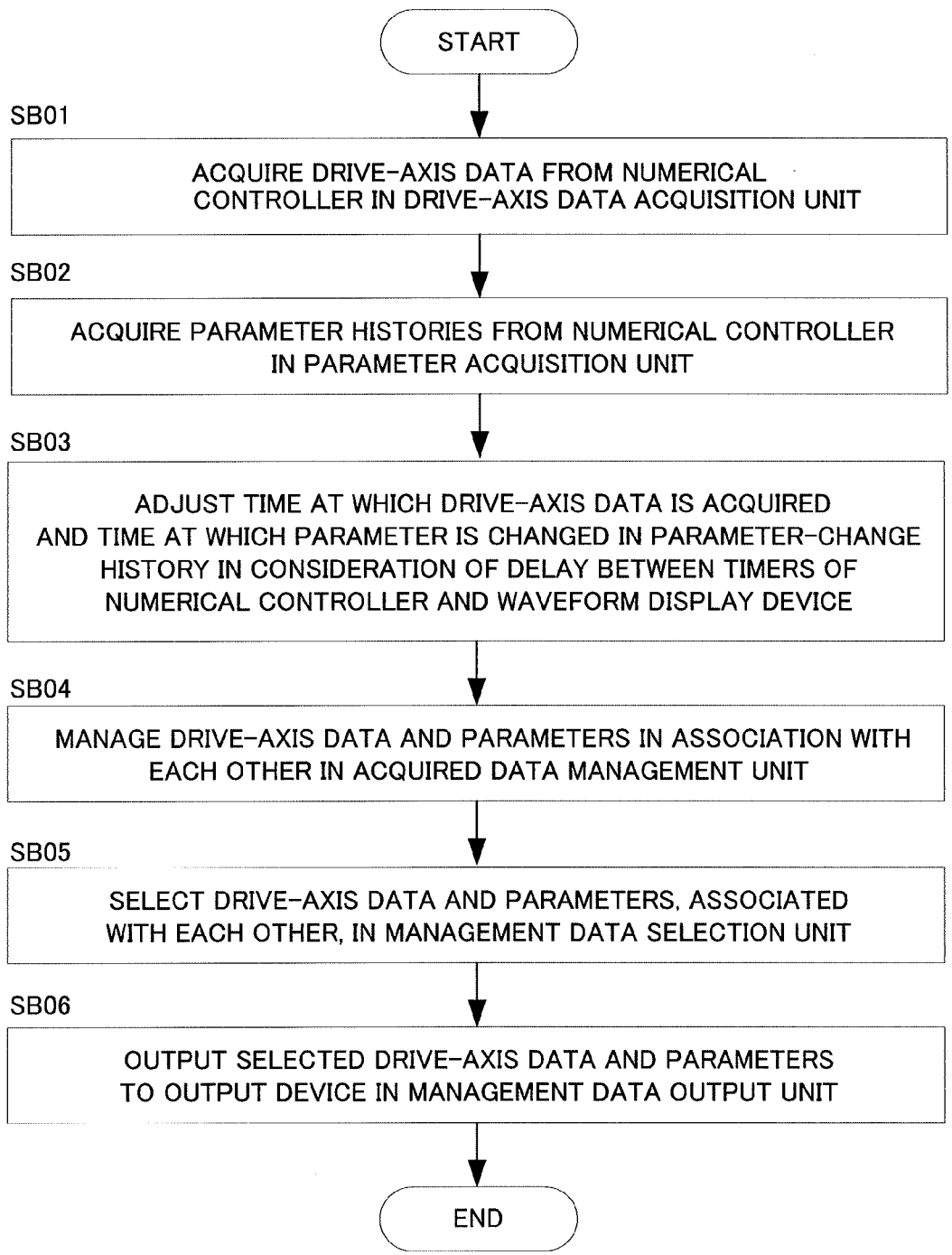
FIG. 5 is a flowchart illustrating management and output processing for drive-axis data and parameters performed by the waveform display device of FIG. 2.

Management and output processing for the drive-axis data and parameters performed by the waveform display device of FIG. 2 will now be described with reference to the flowchart of FIG. 5. The following is a description of steps of this processing.

[Step SB01] In the drive-axis data acquisition unit 31, the drive-axis data are acquired from the numerical controller 10.

[Step SB02] In the parameter acquisition unit 32, the parameter histories are acquired from the numerical controller 10.

[Step SB03] In the time adjustment unit 37, a time at which drive-axis data is acquired and a time at which a parameter is changed in the parameter-change history are adjusted in consideration of a time lag (or delay) between the timer 11 of the numerical controller 10 and timer 38 of the waveform display device 30.

[Step SB04] In the acquired data management unit 33, the drive-axis data and parameters are managed in association with each other.

[Step SB05] In the management data selection unit 34, the drive-axis data and parameters, associated with each other, are selected.

[Step SB06] In the management data output unit 35, the drive-axis data and parameters selected by the management data selection unit 34 are output to the output device 36, whereupon this processing ends.

The invention claimed is:

1. An apparatus, comprising:
   a waveform display device including a data management function, which is connected to a numerical controller configured to drivingly control a machine tool, configured to acquire drive-axis data representative of an operation and/or state of the machine tool obtained from the numerical controller, and display a waveform of the drive-axis data, the waveform display device being configured to:
   acquire the drive-axis data from the numerical controller;
   acquire a parameter of the numerical controller from the numerical controller; and
   manage the drive-axis data and the parameter in association with each other based on a time at which the drive axis data is acquired and a time at which the parameter is acquired, wherein the time at which the drive-axis data is acquired and the time at which the parameter is acquired are generated by a timer of the waveform display device;
   adjust the time at which the drive-axis data is acquired and the time at which the parameter is changed based on a time lag between the timer of the numerical controller and the timer waveform display device; and
   acquire time data from the timer of the numerical controller and time data from the timer of the waveform display device simultaneously.

2. The apparatus of claim 1, wherein the waveform display device is configured to add a difference between the time data from the timer of the numerical controller and the time data from the timer of the waveform display device to the time at which the drive-axis data is acquired or the time at which the parameters are acquired or changed.

3. The apparatus of claim 1, wherein the waveform display device is further configured to acquire a parameter-change history including a time at which the parameter is changed from the numerical controller, and manage the drive-axis data and a parameter in the parameter-change history in association with each other, based on the time at which the drive-axis data is acquired and the time at which the parameter is changed in the parameter-change history.

4. The apparatus of claim 1, wherein the waveform display device is configured to arbitrarily select the drive-axis data and the parameter that are managed in association with each other.

5. The apparatus according to claim 4, wherein the waveform display device is configured to output the drive-axis data and the parameter selected to at least one of output devices including a display unit and a memory unit.

6. The apparatus according to claim 4, wherein the waveform display device is configured to output the drive-axis data and the selected parameter to at least one of output devices including a display unit and a memory unit.

7. The apparatus of claim 1, wherein the acquired parameter is a parameter for assigning operatizing conditions of the numerical controller from the numerical controller.

8. The apparatus of claim 1, wherein the acquired parameter is a parameter for assigning operatizing conditions including acceleration/deceleration of the numerical controller from the numerical controller.

9. The apparatus of claim 1, wherein the acquired parameter is a parameter for assigning operating conditions including control systems and/or acceleration/deceleration of the numerical controller from the numerical controller.

\* \* \* \* \*